Aug. 3, 1954 V. H. HASSELQUIST 2,685,436
APPARATUS FOR FOAMING LIQUIDS
Filed Aug. 31, 1950 3 Sheets-Sheet 1

Inventor
Victor H. Hasselquist
By Robert W. Furlong
Atty

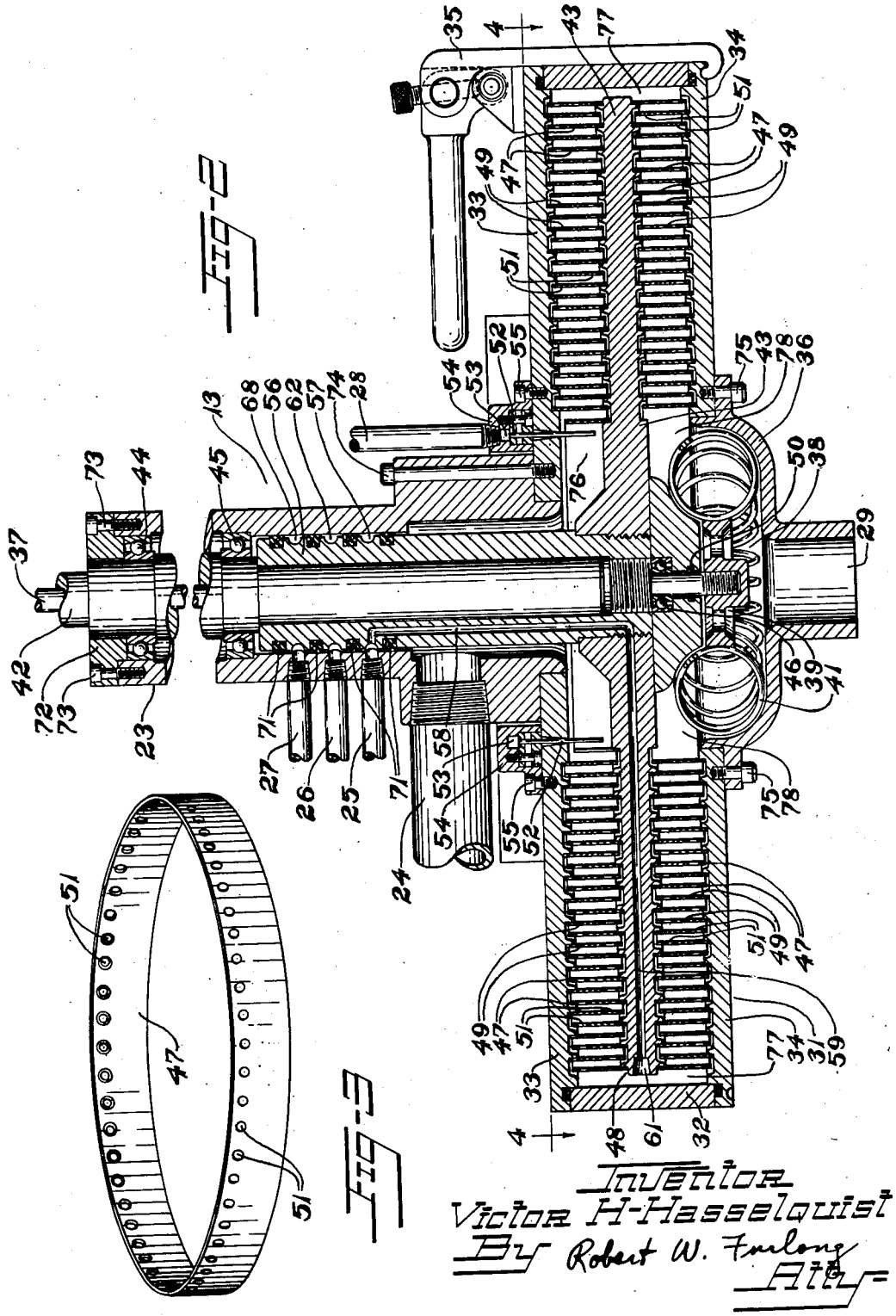

Aug. 3, 1954 V. H. HASSELQUIST 2,685,436
APPARATUS FOR FOAMING LIQUIDS
Filed Aug. 31, 1950 3 Sheets-Sheet 3

Inventor
Victor H. Hasselquist
By Robert W. Furlong
Atty

Patented Aug. 3, 1954

2,685,436

UNITED STATES PATENT OFFICE 2,685,436

APPARATUS FOR FOAMING LIQUIDS

Victor H. Hasselquist, Akron, Ohio, assignor to The B. F. Goodrich Company, New York, N. Y., a corporation of New York Application August 31, 1950, Serial No. 182,589

7 Claims. (Cl. 259—8)

This invention relates to an apparatus for the continuous production of a foamed substance, and more particularly to an apparatus for foaming a liquid and mixing dispersions therewith.

It is an object of the invention to provide an apparatus for foaming a liquid, or mixing and foaming several liquids or dispersions at one time in a continuous manner.

It is a further object to provide such apparatus which will mix compounding ingredients with a rubber latex which is being foamed.

It is also an object to provide an apparatus which will continuously foam a rubber latex and will also mix with such a foam, dispersions of coagulants and any desired compounding ingredients.

Other objects will be apparent from the description which follows.

These objects are attained by providing an apparatus which foams and thoroughly mixes the materials being treated.

In the drawings Fig. 1 is an elevation of the entire apparatus;

Fig. 2 is a detailed view of the foaming device, partly in cross-section to reveal the essential elements thereof;

Fig. 3 is a perspective view of one of the concentric bands used both as stators and rotors in the foaming chamber of the apparatus;

The apparatus comprises a mounting frame 11 at the top of which is an eye 12 by which the apparatus is supported.

Figure 1:
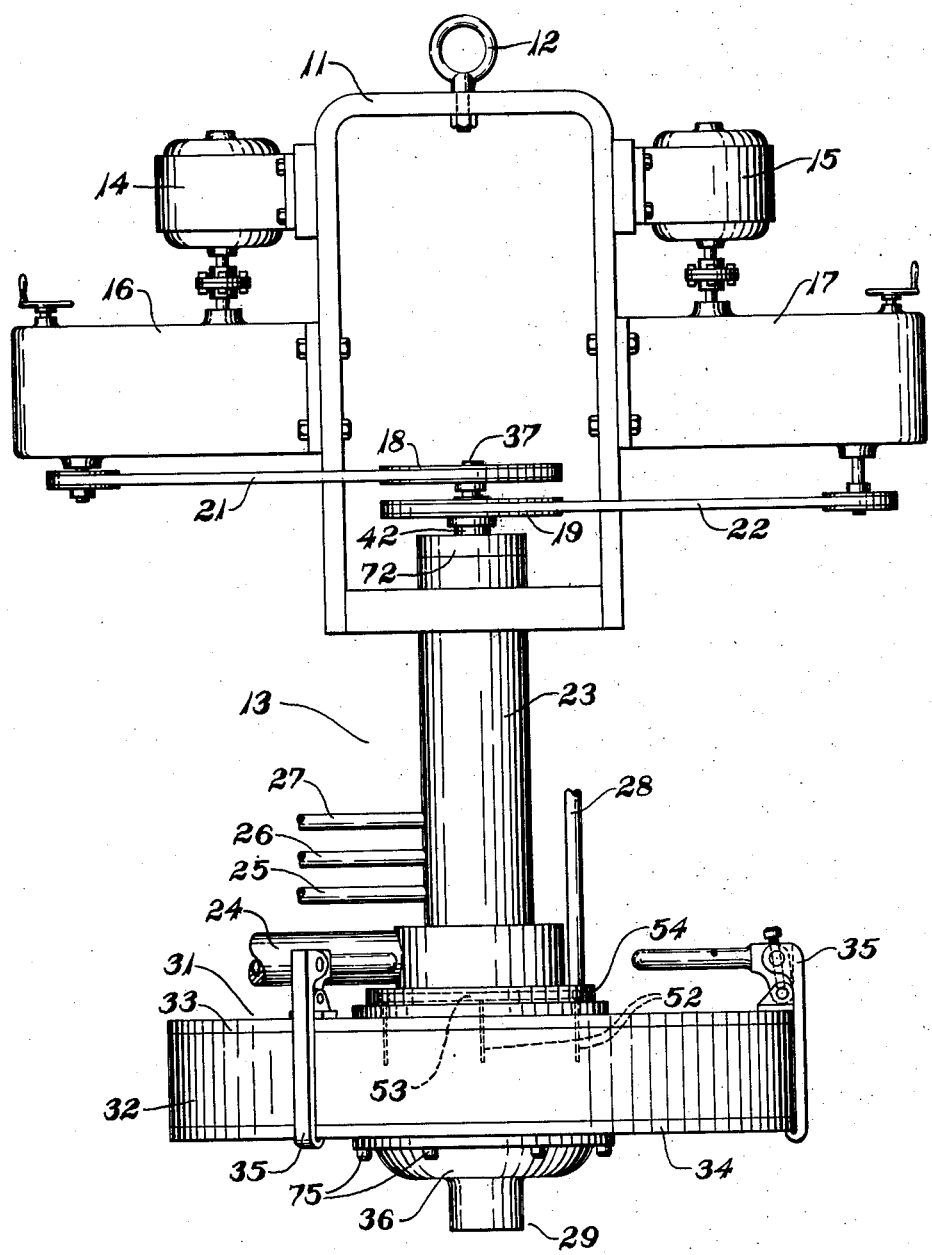
Figure 4:
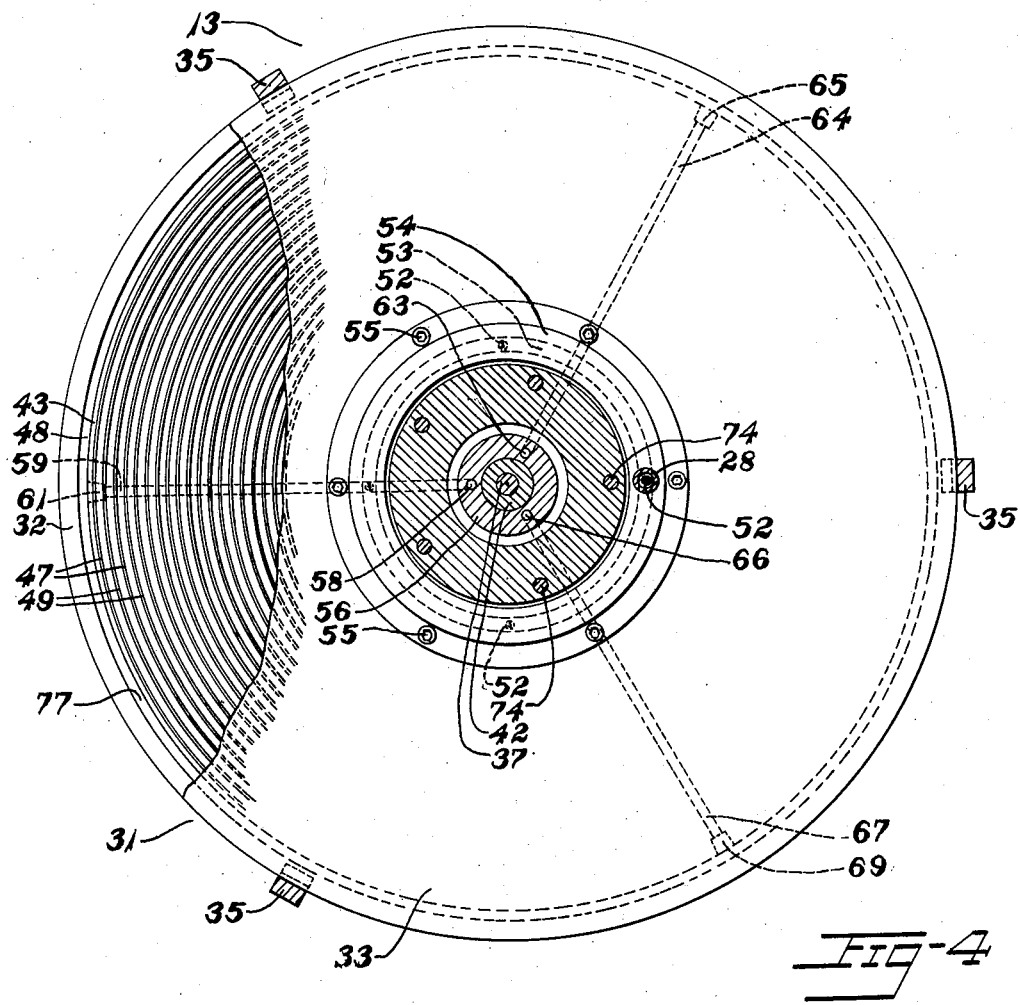
Fig. 4 is a cross-section on line 4—4 of Fig. 2 with the foaming chamber partly cut away to show the concentric stators and rotors.
Figure 5:
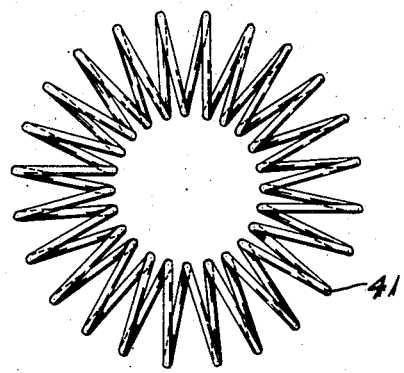
Fig. 5 is a plan view of the annular, helical spring which is an element of the rotor for the after-mixer.

On frame 11 is mounted the foam unit 13, the driving motors 14 and 15 and gear boxes 16 and 17. The gear boxes are connected with the sheaves 18 and 19 of the foam apparatus 13 by V-belts 21 and 22. The foam unit 13 is mounted upon frame 11 by the shaft housing 23 while the body of the foam unit is disposed below the frame as shown in Fig. 1.

Foam unit 13 is a completely enclosed unit having six openings. Pipe 24 is the inlet for latex. Inlets 25, 26 and 27 are for dispersions of compounding ingredients and/or coagulation agents. Pipe 28 is an air inlet. The discharge tube 29 is the sole outlet for the mixed and foamed product. The main housing 31 is of 3-piece construction consisting of a ring 32, an upper plate 33, and a lower plate 34 all secured together by clamps 35, 35. The after-mixer housing 36 is secured to lower plate 34 by means of cap screws. The discharge tube 29 is an integral part of the after-mixer housing 36.

Sheave 18, driven by motor 14 which is coupled with the speed reducer located in gear box 16, is mounted upon the small solid shaft 37 which in turn is secured to the rotor 38 of the after-mixer. The rotor 38 comprises a wheel 39 and an annular helical spring 41 which snaps into place and is easily removed for cleaning. Concentric with and surrounding shaft 37 is hollow shaft 42 having sheave 19 secured to its upper end and having band plate 43 secured to its lower end. Shaft 42 is journalled in ball bearings 44, 45 and shaft 37 is journalled in the drilled passage of shaft 42 throughout substantially its entire length and in ball bearings 46 at its lower end, and is provided with seal 50 to keep the liquid being foamed away from the bearings.

Upon rotating band plate 43 are mounted concentric bands 47, 47 which make up a part of the foam rotor 48. These concentric bands are mounted on both the upper and lower surfaces of the band plate as shown in Fig. 2. Concentric stator bands 49, 49 extend into the spaces between the rotor bands 47, 47, being mounted on the lower surface of the upper plate 33 and likewise upon the upper surface of the bottom plate 34. Both the stator and rotor bands have drilled holes 51, 51 at spaced intervals around their entire periphery. These holes are drilled near the edge of the band opposite that edge which is secured to band plate 43 or to the plates 33 and 34 so that the holes in adjacent bands are vertically offset.

In the upper plate 33 are drilled passages through which are inserted a plurality of needle nozzles 52, 52. These nozzles are connected to the air inlet pipe 28 through the manifold 53 which is in a housing 54 secured to the upper plate 33 by cap screws 55, 55.

Shaft housing 23 holds ball bearings 44, 45 and disposed therebelow is the dispersion distributing sleeve 56. This sleeve 56 which is within shaft housing 23 has a circumferential groove 57 that is a collecting ring for the dispersion introduced through inlet 25. The groove 57 opens into drilled passage 58 in the distributing sleeve 56 and this in turn into drilled passage 59 in the rotor band plate 43. The passage 59 ends at the periphery of the band plate 43 in a discharge opening 61. Inlet pipe 26 is connected with circumferential groove 62 which is connected by vertically drilled passage 63 with another drilled passage 64 and the discharge opening 65 in the plate 43. In the same manner inlet line 27 is connected by drilled passages 66 and 67 and groove 68 with discharge opening 69 in the plate 43. The circumferential grooves 57, 62 and 68 are sealed one from the other by ring packing 71.

The parts of the unit are secured together in such a manner as to allow disassembly. The bearing cap 72 is secured to shaft housing 23 by cap screws 73. The shaft housing 23 is secured to the upper plate 33 by cap screws 74. The after-mixer housing 36 is secured to the lower plate 34 by cap screws 75. The cap screws 55, 73, 74, 75 are not removed during normal use of the apparatus but may be removed for replacement of parts or for complete overhaul.

In using the apparatus, motors 14 and 15 are started and latex is supplied through inlet 24 at a pressure great enough to overcome the back pressure of the foam unit while in operation. This back pressure is caused by the labyrinth produced by the staggered holes on the stator and rotor bands and by the wall friction of the circuitous path. The necessary conditioning agents such as compounding ingredients, coagulating agents, etc. in dispersion form are supplied through inlets 25, 26 and 27. Air is supplied to pipe 28 at the necessary pressure.

The latex flows through pipe 24 into the foaming chamber 76 where the air is introduced into the flowing latex through nozzles 52, 52. The air and latex mixture then flows radially through the upper winding path provided by the drilled holes 51, 51 in the alternate stator bands 49 and rotor bands 47. As the mixture flows radially through the holes 51, the holes which are in the rotor bands 47 are moving rapidly so as to provide a sub-division of the air bubbles or globules of air into fine bubbles of air.

When the latex and air mixture reaches the outer periphery of the rotor band plate and enters the dispersion chamber 77, the dispersions of compounding ingredients from outlets 61, 65 and 69 are introduced. The outlets 61, 65 and 69 are rotating and as a result of this rotation a uniform distribution of the dispersions in the liquid being foamed takes place. Although the distribution is uniform, it has been found that complete mixing does not take place without the addition of an after-mixer rotor 38, the function of which is described hereafter. The mixture of latex, air and compounding ingredients then follows through the lower winding path towards the hub of the band plate. The circuitous and meandering path provided by the staggered holes 51 in the stator and rotor bands in conjunction with the sub-division of the air bubbles by holes 51 further mixes and foams the mixture of air and latex. As the mixture reaches the chamber 78 it is subjected to an after-mixing step. The after-mixer rotor further whips the latex froth before it is discharged through outlet 29 and in this way completes the mixing of the dispersions and the latex froth. Since the dispersions of compounding ingredients are added at the periphery of the band plate and since the latex froth and dispersions tend to travel substantially radially toward the center of the plate, it is preferable to mix the froth and dispersions by a rotor such as that indicated by numeral 38.

One modification which may be desirable in some applications of the apparatus of this invention is to move the discharge openings 61, 65 and 69 for the compounding ingredient dispersions. These openings may be located at the lower side of plate 43 nearer the center of the plate or at other locations as desired.

After use, the apparatus may be disassembled and cleaned if desired, as follows. Clamps 35, 35 are loosened and removed. The lower plate 34, after-mixer housing 36 and ring 32 are dropped down and set aside. The annular helical spring 41 is removed from wheel 39. Wheel 39 is unscrewed from shaft 37 and the rotating band plate 43 with the attached dispersion distributing hub 56 is unscrewed from the hollow shaft 42 and dropped down and set aside. All of the disassembled parts can be cleaned and then returned in their proper relative positions for the next run. The reverse of the sequence just given is followed for reassembly.

The output of such a machine can be varied to a limited extent by changing the pressures on the inlet line; however, it is more practical to change the size of the foam unit to increase the capacity.

The materials used for constructing the foaming unit are not critical. However, it is preferable to use corrosion-resisting materials such as stainless steel or similar suitable materials.

The clearances between stator and rotor bands may be varied and likewise the end clearance between the rotor bands and the upper plate or the rotor bands and the lower plate may be varied but the clearances are preferably kept low to prevent any but a negligible flow of latex therebetween with a resulting maximum flow through the band holes 51, 51.

The speeds of the rotating band plate and the after-mixer rotor may be varied independently by means of the variable speed reducers in gear boxes 16, 17 as needed with different rates of flow and with different materials. It may be desirable to increase or decrease the number of air inlet nozzles when the material being foamed is changed.

Various modifications may be made without departing from the spirit and scope of the invention as defined in the following claims.

I claim:

1. Apparatus for foaming a liquid comprising a foaming chamber divided into two connected compartments by a rotatable disc, said disc having perforated concentric bands mounted on opposite faces thereof extending into said compartments, concentric perforated bands mounted on the walls of said foaming chamber and extending between said perforated concentric bands mounted on said rotatable disc, means for rotating said disc, inlet means for introducing into one of said compartments adjacent the center of said disc a gas and a foamable liquid, means for introducing other liquids into said chamber adjacent the periphery of said disc, means for mixing said liquids, and outlet means adjacent the center of said disc at the side opposed to said inlet means.

2. Apparatus for foaming liquids comprising a chamber having a plurality of spaced concentric perforated bands fixed to opposing walls thereof, within said chamber a rotatable disc having spaced concentric perforated bands on both faces thereof, said bands of the disc interleaving said fixed bands, means for rotating said disc, inlet means for introducing a stream of a foamable liquid into said chamber adjacent the center of said disc, means for introducing a stream of gas into said stream of liquid adjacent the center of said disc, means for introducing other liquids into said chamber adjacent the periphery of said disc, means for mixing said liquids, and outlet means adjacent the center of said disc at the side opposed to said inlet means.

3. Apparatus for foaming a liquid and adding compounding ingredients thereto comprising a rotatable disc having concentric spaced perforated bands mounted on both faces thereof, an after-mixer rotor having a smaller diameter than and located adjacent to said disc, means for rotating said rotor and said disc, a housing for said disc which defines a foaming chamber having concentric perforated bands on opposite walls thereof, said foaming chamber bands extending into the spaces between said disc bands, inlet means for introducing into said chamber adjacent the center of said disc a gas and a foamable liquid, outlet means adjacent the center of said disc at the side opposed to said inlet means, and means for introducing into said foaming chamber between said inlet and outlet liquid dispersions of compounding ingredients.

4. In a foaming and mixing apparatus, a flat cylindrical chamber and a rotatable disc disposed therein, concentric perforated bands mounted on both sides of said disc, interleaving concentric perforated bands mounted on opposed walls of said housing to obstruct the passage of liquid through said apparatus except through the perforations of said bands, inlet means for introducing a foamable liquid and a gas into said chamber at a position near the center of said disc, means for rotating said disc, said disc including means adjacent its periphery for introducing other liquids into said chamber, an after-mixer comprising an annular helical wire rotor coaxial with said disc remote from said inlet means and rotatable independently thereof, means for rotating said rotor, and an outlet adjacent said after-mixer.

5. Apparatus for foaming a liquid and mixing conditioning agents therewith which comprises a generally cylindrical flat foaming chamber, a disc mounted for rotation within said chamber coaxial therewith, a plurality of spaced concentric ribs secured to and projecting from the opposing faces of said disc and chamber, the outer margin of each said rib extending closely adjacent the opposing face, the ribs secured to said disc alternating with the ribs secured to said chamber to form a plurality of concentric channels between said disc and said chamber, each said rib having a plurality of transverse openings along its perimeter to permit flow of fluid therethrough radially of said disc, inlet means for introducing a stream of foamable liquid into said chamber adjacent the center of said disc at one face thereof, means for introducing a fine stream of gas into said liquid stream adjacent said inlet, said disc including means for introducing said conditioning agents into said chamber adjacent the periphery of said disc, mixing means including an annular helical member mounted for rotation coaxially adjacent the face of said disc remote from said inlet, said annular helical member having a diameter relatively small as compared to said disc, means for rotating said disc and said mixing means, and outlet means adjacent said mixing means.

6. Apparatus for foaming a liquid comprising a generally cylindrical foaming chamber, a generally flat, circular disc mounted concentrically within said chamber, said disc dividing the chamber into two compartments communicating with each other only around the periphery of the disc, inlet means in one said compartment adjacent the center of the disc for introducing a foamable liquid and a gas to form globules of gas in said liquid, cooperating means disposed on the opposing flat faces of said disc and said chamber for subdividing said globules of gas in said liquid, rotatable means engaged with the center of the disc for rotating the disc, a housing in which said rotatable means is journaled, a plurality of liquid-inlet openings in said housing spaced axially on said housing, a plurality of annular grooves in said rotatable means each in register with one of said housing liquid-inlet openings, a passage extending from each of said grooves through said rotatable means and also extending through said disc and communicating with said foaming chamber adjacent the periphery of the disc, and outlet means for removing the foamed liquid from said chamber adjacent the center of the disc at the side opposite said inlet.

7. An apparatus for foaming a liquid comprising a foaming chamber divided into two connected compartments by a rotatable disc, said disc having perforated concentric bands mounted on opposite faces thereof extending into said compartments, concentric perforated bands mounted on the walls of said foaming chamber and extending between said perforated concentric bands mounted on said rotatable disc, means for rotating said disc, inlet means for introducing into one of said compartments adjacent the center of said disc a gas and a foamable liquid, means for introducing other liquid into said chamber including passageways extending through said disc and communicating with said chamber through openings in the periphery of said disc, means for mixing said liquids, and outlet means adjacent the center of said disc at the side opposite said inlet means.

References Cited in the file of this patent

UNITED STATES PATENTS

| Number | Name | Date |
| --- | --- | --- |
| 797,965 | Lagrange | Aug. 22, 1905 |
| 1,340,464 | Schaub | May 18, 1920 |
| 1,711,154 | Michal | Apr. 30, 1929 |
| 2,114,275 | Murphy et al. | Apr. 12, 1938 |
| 2,244,616 | Greenup et al. | June 3, 1941 |
| 2,307,082 | Grotenhuis | Jan. 5, 1943 |
| 2,324,988 | Greenup et al. | July 20, 1943 |
| 2,475,191 | Marvin et al. | July 5, 1949 |
| 2,540,040 | Baker | Jan. 30, 1951 |
| 2,546,691 | Green | Mar. 27, 1951 |
| 2,572,049 | Oakes | Oct. 23, 1951 |

FOREIGN PATENTS

| Number | Country | Date |
| --- | --- | --- |
| 129,757 | Great Britain | Dec. 11, 1918 |